No. 890,495. PATENTED JUNE 9, 1908.
B. & C. CARLSON.
POTATO BUG EXTERMINATOR.
APPLICATION FILED AUG. 15, 1907.

2 SHEETS—SHEET 1.

Witnesses
F. C. Gilson
Wm. Bagger

Inventors
Benjamin Carlson.
Casper Carlson.
By Victor J. Evans
Attorney

No. 890,495. PATENTED JUNE 9, 1908.
B. & C. CARLSON.
POTATO BUG EXTERMINATOR.
APPLICATION FILED AUG. 15, 1907.

2 SHEETS—SHEET 2.

Witnesses
F. L. Gibson.
Wm. Bagger.

Inventors.
Benjamin Carlson.
Casper Carlson.
By Victor J. Evans
Attorney

UNITED STATES PATENT OFFICE.

BENJAMIN CARLSON AND CASPER CARLSON, OF ONEKAMA, MICHIGAN.

POTATO-BUG EXTERMINATOR.

No. 890,495.    Specification of Letters Patent.    Patented June 9, 1908.

Application filed August 15, 1907. Serial No. 388,695.

*To all whom it may concern:*

Be it known that we, BENJAMIN CARLSON and CASPER CARLSON, citizens of the United States, residing at Onekama, in the county of Manistee and State of Michigan, have invented new and useful Improvements in Potato-Bug Exterminators, of which the following is a specification.

This invention relates to machines for destroying plant infesting insects, and it has particular reference to an improved machine for gathering and destroying potato bugs.

The object of the invention is to provide a simple, inexpensive and easily operated device or machine, including in its organization a pair of reels for simultaneously operating upon two rows of vines, between which the machine is drawn over the field, and endless aprons for receiving and conveying the insects as they are swept off the vines; said aprons being supported upon rollers, some of which operate to mash and effectively destroy the insects; further objects being to simplify and improve the construction and operation of this class of devices.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention; it being, however, understood that no limitation is necessarily made to the precise structural details therein exhibited, but that changes, alterations and modifications within the scope of the invention may be resorted to when desired.

Figure 1:
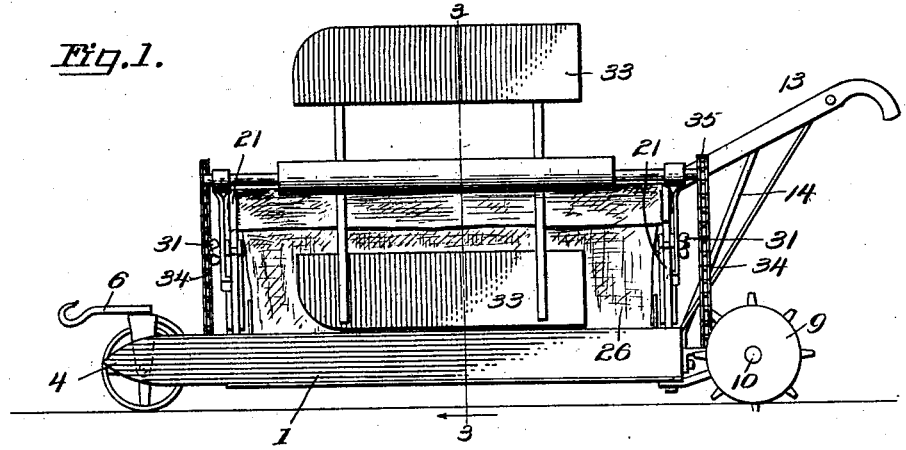
Figure 2:
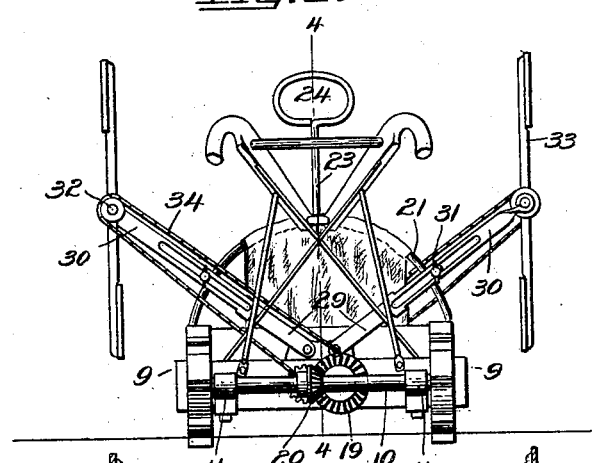
Figure 3:
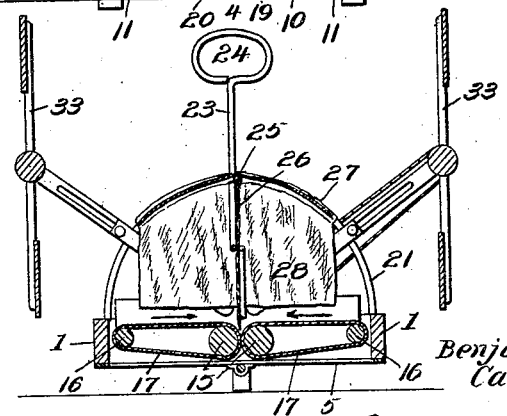
Figure 4:
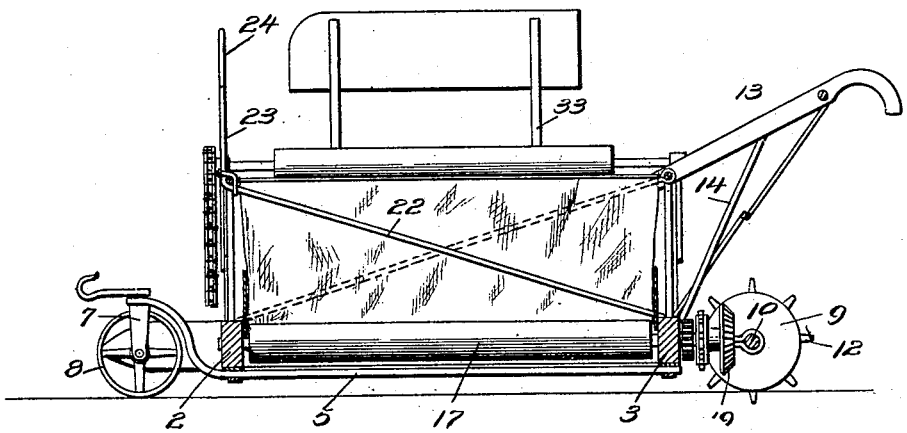
Figure 5:
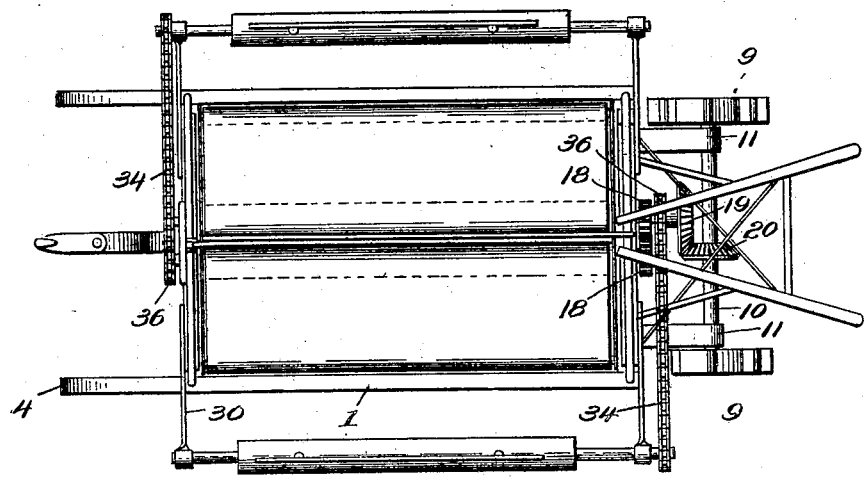
Figure 6:
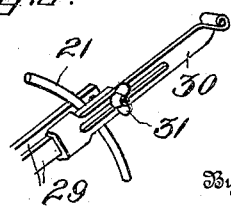

In the drawings, Figure 1 is a side elevation of a machine constructed in accordance with the invention. Fig. 2 is a rear elevation of the same. Fig. 3 is a transverse sectional view taken on the plane indicated by the line 3—3 in Fig. 1. Fig. 4 is a longitudinal vertical sectional view taken on the plane indicated by the line 4—4 in Fig. 2. Fig. 5 is a top plan view. Fig. 6 is a detail view of the adjusting device and the correlated parts.

Corresponding parts in the several figures are denoted by like characters of reference.

The frame of the improved machine, which is preferably of rectangular form, is composed of side members 1—1 and front and rear cross-bars 2—3, said side members being preferably extended in front of the front cross-bar 2 and provided with tapering points 4 that will readily pass by the vines without tearing or injuring the latter.

An auxiliary bottom frame 5 made preferably of strap iron is provided, said bottom frame being equipped with a draft hook 6 and with a swiveled clip 7 in which a guide wheel 8 is supported for rotation. The transporting and driving wheels 9—9 are secured upon a shaft or axle 10 which is supported for rotation in brackets 11 extending rearwardly from the main frame, said driving wheels being preferably provided with peripheral lugs 12 that grip or engage the soil so as to cause the wheels to rotate without fail. The main frame is provided with handles 13 sustained and reinforced by braces 14 to enable the machine to be conveniently guided by the operator who walks in rear.

The main frame is provided with bearings for longitudinally disposed rollers, two of which 15—15 are disposed closely together adjacent to the longitudinal center of the frame, the other or outer rollers 16—16 being positioned adjacent to the side members of the frame. Each pair of rollers 15—16 carries an endless apron 17, and said aprons coöperate to form the bed of the machine, as will be readily seen in Fig. 3. The inner rollers 15—15 are provided with intermeshing pinions 18 whereby said rollers, and the aprons, will be operated in opposite directions. One of the rollers 16, or the shaft of said roller, is extended rearwardly and carries a bevel gear 19 meshing with a bevel pinion 20 upon the driving shaft 10 from which motion will be transmitted to the rollers and the aprons, when the machine is in operation.

Supported upon the main frame, at the front and rear ends of the latter are upward-extending approximately semi-circular arches 21 which are raised and reinforced by centrally disposed diagonal braces 22, one of which is extended upwardly at its front end to form a bracket 23 having a terminal loop 24 which forms a support for the lines or reins used for guiding the draft animals. A longitudinal brace rod 25 which connects the arches 21 serves to support a centrally disposed curtain 26; and a hood 27 including end curtains 28 suitably supported upon the said arches.

Pivoted upon the end members 2 and 3 of the main frame are pairs of arms or brackets 29 having slotted extension arms 30 adjustably connected therewith; said brackets and extension members being adjustably connected with the arches 21 by means of fastening members 31 which may be in the nature of bolts equipped with wing nuts; or said fastening members may be of any suitable and appropriate well-known construction. The extension members 30 of the brackets 29 at the front and rear ends of the frame afford bearings for shafts 32 carrying reels 33 which are driven by link belts 34 connecting sprocket wheels 35 upon the reel carrying shafts with sprocket wheels 36 upon the rollers 15; the link belts and sprocket wheels being suitably disposed at the front and rear ends of the frame in such a manner as to cause motion in the proper direction to be transmitted to the reel carrying shafts.

It will be seen from the foregoing description that when the machine is propelled over the field, between two rows of potato vines, the reels 33 will be rotated in such a manner as to engage the vines and to dislodge insects feeding thereon, the insects being swept onto the aprons 17 which are moving in the directions of the arrows shown in Fig. 3; the insects will be carried between the rollers 15 and will thus be effectively destroyed and deposited upon the ground between the rows. The reel carrying arms or brackets are capable of adjustment with relation to the vines that are to be operated upon, and the general structure of the machine is simple and thoroughly efficient for the purposes for which it is provided.

Having thus fully described the invention, what is claimed as new is:—

1. In a machine of the character described, a frame, an auxiliary bottom frame, rotary supporting means for said frame including a driven shaft or axle, pairs of rollers supported for rotation in the former mentioned frame, endless aprons guided over the rollers, arches supported adjacent to the front and rear ends of the frame, diagonal braces reinforcing said arches, pivotally supported brackets upon the ends of the frame, slotted extension arms connected with said brackets, means for adjustably connecting the brackets and extension arms, reels supported for rotation in the extension arms means for transmitting motion to the reels from the driven axle and means for transmitting motion to the apron carrying rollers from the driven axle.

2. In a machine of the class described, a frame, rotary supporting means for said frame including a driven shaft or axle, pairs of rollers supported for rotation in the frame, endless aprons guided over the rollers, arches supported at the front and rear ends of the frame, diagonal braces reinforcing said arches, one of said braces being formed with an extension bracket having a terminal loop, a longitudinal brace connecting the arches, a curtain suspended from said brace, a hood including end curtains supported upon the arches, suitably supported reels arranged for operation adjacent to the frame, and means for transmitting motion to the reels and to the apron carrying rollers from the driven axle.

3. In a machine of the class described, a frame, rotary supporting means for said frame, rollers supported for rotation in the frame and carrying endless aprons driven in opposite directions, arches supported at the front and rear ends of the frame, a dividing curtain and a hood including end curtains supported by the arches, pivotally supported brackets upon the ends of the frame, slotted extension arms connected with said brackets, means for connecting the brackets and the extension arms adjustably with the arches, reels supported for rotation by the extension arms, means for transmitting motion to the reels from the rotary supporting means and means for transmitting motion to the apron carrying rollers from said rotary supporting means.

In testimony whereof we affix our signatures in presence of two witnesses.

BENJAMIN CARLSON.
CASPER CARLSON.

Witnesses:
E. J. RICHMOND,
EVART C. RICHMOND.